United States Patent [19]
Field et al.

[11] Patent Number: 5,001,757
[45] Date of Patent: Mar. 19, 1991

[54] FM STEREO TONE DETECTOR

[75] Inventors: Thomas L. Field, Rutland, Mass.; Oliver L. Richards, Jr., N. Grosvenor Dale, Conn.

[73] Assignee: Sprague Electric Company, North Adams, Mass.

[21] Appl. No.: 455,052

[22] Filed: Dec. 22, 1989

[51] Int. Cl.$^5$ ............................................... H04H 5/00
[52] U.S. Cl. ................................. 381/13; 381/14; 381/12; 381/106
[58] Field of Search ................. 381/15, 13, 12, 3, 106, 381/2, 4, 6, 5, 14, 16; 455/45, 208

[56] References Cited

U.S. PATENT DOCUMENTS

| | | | |
|---|---|---|---|
| 4,602,380 | 7/1986 | Stebbings | 381/13 |
| 4,602,381 | 7/1986 | Cugnini et al. | 381/13 |
| 4,607,393 | 8/1986 | Nolde et al. | 455/208 |
| 4,618,981 | 10/1986 | Ecklund | 381/15 |
| 4,679,238 | 7/1987 | Markovic et al. | 381/15 |
| 4,680,792 | 7/1987 | Tanaka et al. | 381/12 |
| 4,809,328 | 2/1989 | Usui et al. | 381/106 |
| 4,852,167 | 7/1989 | Usui et al. | 381/106 |
| 4,914,680 | 4/1990 | Tanno et al. | |

FOREIGN PATENT DOCUMENTS 58-83446 5/1983 Japan .................................. 381/3

OTHER PUBLICATIONS

T. Ishikawa et al., "FMX Decoder IC Development", IEEE Trans. on Consumer Electronics, vol. CE-33, No. 3, Aug. 1987, pp. 312-317.

Primary Examiner—Jin F. Ng
Assistant Examiner—Sylvia Chen

[57] ABSTRACT

A stereo FM radio transmission system with FMX transmission and reception capability includes a transmitter that transmits a pilot-coherent FMX-tone indicator signal at a frequency of an exact integer submultiple of the pilot frequency. The system also includes a receiver for dividing the frequency of the received pilot signal by various submultiples, nearly equal to the exact submultiple, toward quickly finding a match in phase of the received tone and the received pilot and finally dividing the pilot by the exact submultiple to establish an operational lock mode of the receiver tone detector to keep-on an FMX-indicator lamp, to change the receiver decoder to an FMX-reception operating mode and to stand by to quickly recapture the pilot and FMX-tone in the event of multipath or other interfering signals.

19 Claims, 4 Drawing Sheets

FM STEREO TONE DETECTOR

BACKGROUND OF THE INVENTION

This invention relates to detectors in an FM stereo receiver for detecting a tone in a multiplexed stereo radio signal, and more particularly for detection of an FMX indicator tone and then for switching the operating mode of the receiver from standard stereo mode to FMX stereo mode.

"FMX" and "FMX Stereo" are TRADEMARKS of Broadcast Technology Partners, Bloomfield Hills, Mich. FMX broadcasting of stereo FM signals entails broadcasting the conventional FM signal modulated with a multiplexed stereo composite signal that includes the standard low frequency M-band containing the L+R audio signal, the standard 19 Khz pilot signal, and the standard S-band containing the AM modulated L-R audio signal with a suppressed 38 Khz/0° subcarrier. The broadcast FMX composite signal additionally includes within the frequency spectrum of the standard S-band, a companded (amplitude compressed) version of the L-R, signal herein referenced to as an S'-band, having a suppressed phase-shifted subcarrier of 38 Khz/90°. The angle is taken relative to the phase (zero crossings) of the 19 Khz pilot.

This FMX transmission is compatible with standard FM stereo receivers that will be capable of providing stereo reception of the FMX broadcast signal but without the FMX reception advantage. An FMX receiver, however, will be capable of receiving that FMX transmitted signal over a greater physical range. An FMX receiver includes a composite-signal decoding circuit with a 38 Khz/0° subcarrier generator and a multiplier to produce the conventional L-R (the left audio minus the right audio) signal, but in addition includes a decoding circuit with a 38 Khz/90° subcarrier generator and a multiplier to produce a second L-R audio frequency signal. That second L-R audio signal that was companded and transmitted modulated on the subcarrier that is 90° out of phase with the conventional subcarrier carrying the L-R signal, is then passed through an expander circuit in the receiver to restore it to its original condition as it was before being companded in the transmitter. The expanded L-R S'-band and S-band signals are demodulated then summed and combined with the L+R M-band in a standard matrixing circuit in the receiver for producing separate left and right audio signals, as is more fully explained by Torick et al in U.S. Pat No. 4,485,483 issued Nov. 27, 1984 and now assigned to Broadcast Technology Partners. An FMX transmitter and receiver are shown respectively in FIG. 1 and FIG. 2.

When an FMX-capable receiver is tuned to a non-FMX stereo transmission, it is necessary to disconnect the second L-R audio signal (demodulated from the S'-band) to avoid noise and distortion. The suppressed subcarrier 38 Khz/90° of the S'-band is AM-modulated with a tone of subaudible frequency to serve as an FMX indicator tone that can be detected in the receiver and used in the receiver to switch in the S'-band decoder circuits and thus enable FMX-mode receiver operation. The detection of the tone also is used to turn on a lamp indicating to the listener that an FMX-type signal is being received. A tone frequency of about 10 Hz is usually chosen.

A tone detector circuit used in receivers of the prior art is illustrated in FIG. 2. This circuit is basically the same phase-locked loop circuit as has been employed in conventional FM stereo radios to detect the 19 Khz pilot.

Tone detector circuit 10 of FIG. 2 has an input conductor 12 typically connected to the output of a 38 Khz/90° demodulator 14 having an input connected to the composite signal conductor 13 at the output of the discriminator of the FMX receiver. This FMX composite signal includes the 10 Hz FMX indicator-tone. Referring to the prior art tone detector 10 of FIG. 3, the demodulator signal is passed through a three-pole low pass filter 15 having a bandpass at 3 db down of about 100 Hz or lower that removes almost all but the 10 Hz tone indicator signal. The output of filter 15 is connected to a mixer 16 that is in turn connected to a level detector 18 via a low pass filter 20. When the FMX tone is detected, the output of the level detector 18 changes from one state or level to another indicating at conductor 17 the reception of an FMX signal transmission. The output of filter 15 is also connected to the phase-locked loop reference signal generator 11 that includes a mixer 22, a single pole low pass filter 24, an oscillator circuit 26 that locks up at a multiple (e.g. 32) of the 10 Hz tone signal, and a frequency divider 28 that divides the 25 oscillator frequency by the same multiple factor (e.g. 32).

Filter 15 removes most of the quadrature L-R audio from the signal presented at the input 12. The low pass filter 20 removes or greatly reduces signal components above about 10 Hz. The voltage controlled oscillator (VCO) 26 is phase-locked to a multiple of the tone signal and the frequency divider 28 divides by the same multiple and provides at output 30 a 10 Hz/0° signal in phase with the incoming 10 Hz tone component of the phase-shifted (quadrature) L-R audio signal (S') at input 12, while at output 32 the quadrature-phase shifted 10 Hz/90° signal is produced for closing the phase-locked loop. The level detector output at conductor 17 is the tone indicator signal, and is also the mode-switch control signal.

Alternative to the phase-locked loop tone detector of FIG. 3 is a detector (not shown) having at least one multipole low pass filter and a counter for dividing down from the 19 Khz pilot signal by 1920 to generate the 10 Hz FMX indicator signal.

The phase-locked loop tone indicators of the prior art have a long response time approaching 2 seconds, have an oscillator requiring factory adjustment (e.g. via variable resistor 34), and have no means to cancel out the 10 Hz signal before or at the FMX expander. The 10 Hz signal in the expander tends to produce unwanted modulation products in the lower part of the audio spectrum. Thus there is required a multipole filter 15 preceeding the phase-locked loop to prevent lockup on odd harmonics of the oscillator, and leads to the need for a number of discrete components and requires a corresponding number of IC pads for connection of the discrete components to the integrated circuit that preferably contains most of the tone indicator circuitry. A substantial part of the cost of the prior art tone detector is attributable to the later two features.

It is an object of the present invention to provide an FMX radio transmission and recovery system having a pilot-coherent FMX-transmission tone indicator signal carried in the transmitted composite signal, and a receiver having a tone detector with a fast detection response time.

It is another object of the present invention to provide a low cost tone detector for use in an FMX-capable stereo radio receiver for cancelling the subaudio FMX-mode-indicating tone in the L-R expander circuit of the receiver.

SUMMARY OF THE INVENTION

A stereo FM radio transmission system of the FMX kind that includes a transmitter for transmitting a high frequency carrier FM modulated by a standard FM stereo composite signal comprised of a L+R M-band, a pilot signal, a L-R S-band and an L-R S'-band. In one aspect of this invention the S'-band includes a subaudible FMX-tone signal added in the S'-band. That tone has a frequency that is an exact integer submultiple of the frequency of the pilot signal and is therefore coherent therewith.

In another aspect of this invention the stereo FM radio transmission system receiver includes a tone detector for recovering the composite signal from the carrier and for recovering the components of the composite signal. The receiver additionally has a novel phase-locked loop capable of generating a signal of the same frequency and phase as is that of the recovered FMX-tone signal, by dividing the frequency of the recovered pilot by the exact integer submultiple to obtain a reference signal, comparing the retrieved tone signal to the reference signal and when the tone signal and reference signal are found to be of the same phase, enabling the combining of the S-band and S'-band signals and for turning on an FMX-mode-indicating lamp.

An advantage of the present invention of using a phase-locked loop with a divider in the tone detector for detecting a pilot-frequency coherent FMX tone signal, is that a divider needs no adjustment: whereas an FMX tone detector of the prior art includes a phase-locked loop with a voltage controlled oscillator that requires adjustment of its uncontrolled oscillating frequency at manufacturing.

However, a phase-locked loop with divider as used in the invention, will lock when the phases of the FMX tone-signal and the pilot-divided reference signal are either in phase or 180° out of phase. In order that the reference signal have the same phase as that of the tone signal, there is added a divider control means capable of directing the divider to initially divide by a different submultiple, to generate in the phase-locked loop a beat note of very low frequency, e.g. @about 0.6 Hz. When the amplitude of the beat note exceeds a predetermined value, a unique output-logic signal level is produced to indicate the presence of the tone signal.

When the first beat note zero crossing becomes coincident with that of the reference signal from the divider, as indicated by an equal phase detector, then the divider control circuit will thereafter direct the divider to divide by the exact integral submultiple to produce a reference signal of same frequency and phase as that of the tone signal. That in-phase condition is then locked in the loop.

This feature has the advantage of generating in the loop, a reference signal of the same frequency and phase as that of the tone signal, which reference signal can be used to cancel the tone signal from the S'-band signal before it enters the FMX expander. It also leads to faster acquisition times.

In another aspect of this invention, in the phase-locked loop the divider provides Walsh function signals, e.g. W1 and W7, the comparator mixer is a dual mixer for using Walsh function, W1 and W7, reference signals. The combination in such a mixer of W1 and W7 Walsh function signals produces a stair stepped approximation to a sine wave with greatly attenuated odd harmonics content. This feature leads to yet another advantage of the tone detector of this invention, namely that only a simple single pole bypass filter is needed for filtering out essentially all of the 38 Khz demodulated L-R bands from the signal entering the phase-locked loop.

DESCRIPTION OF THE PREFERRED EMBODIMENTS

Figure 1:
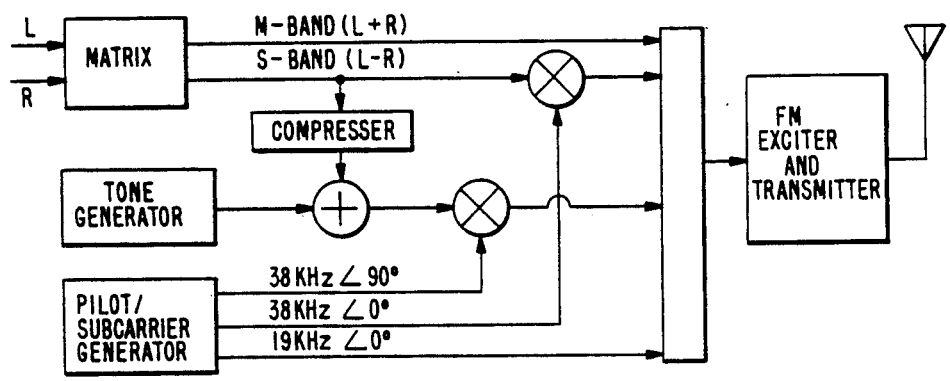
FIG. 1 shows a block diagram of a prior art FMX transmitter.
Figure 4:
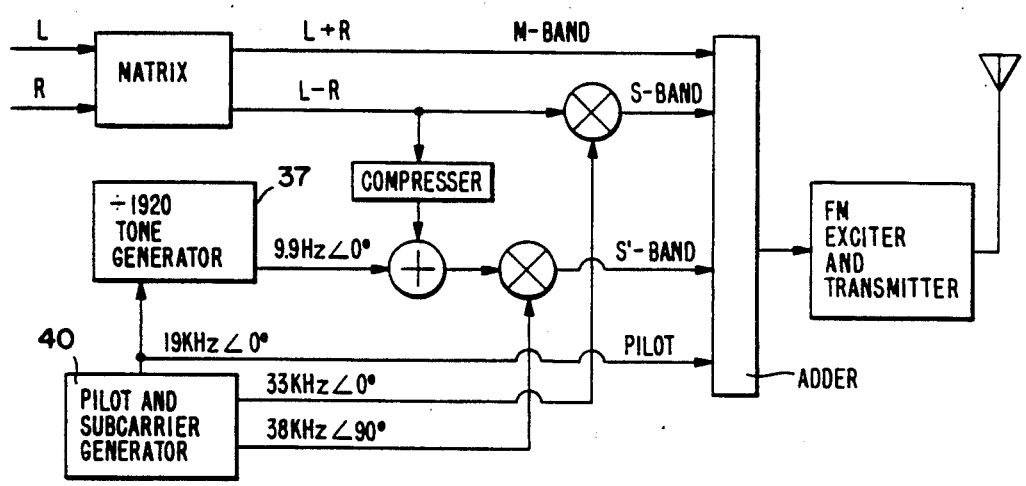
FIG. 4 shows a block diagram of an FMX transmitter of the present invention providing a pilot-phase-coherent tone component.

The FMX transmitter shown in FIG. 4 differs from the prior art transmitter of FIG. 1 in the means for generating the sub-audio tone. In the preferred embodiment of the FIG. 4 transmitter, the tone generator 37 is comprised of a phase-locked loop that includes a multiplier serving as a frequency divider that divides the 19 Khz pilot signal from the pilot and subcarrier generator 40 by a submultiple of 1920 to generate at the output of the divider 37 a tone signal of frequency 19 Khz/1920 or 9.895833 Hz, abbreviated in places herein as 9.9 Hz or 0.0099 KHz. In addition, the 9.9 Hz tone signal is locked in phase with the pilot signal and is written 9.9 Hz/0°. This feature of the transmitted FM signal wherein the frequency of the subsonic FMX tone signal is exactly an integer submultiple of and is phase coherent with respect to the 19 Khz pilot signal distinguishes this transmitter from those of the prior art and makes possible the use of the receiver of this invention.

Figure 5:
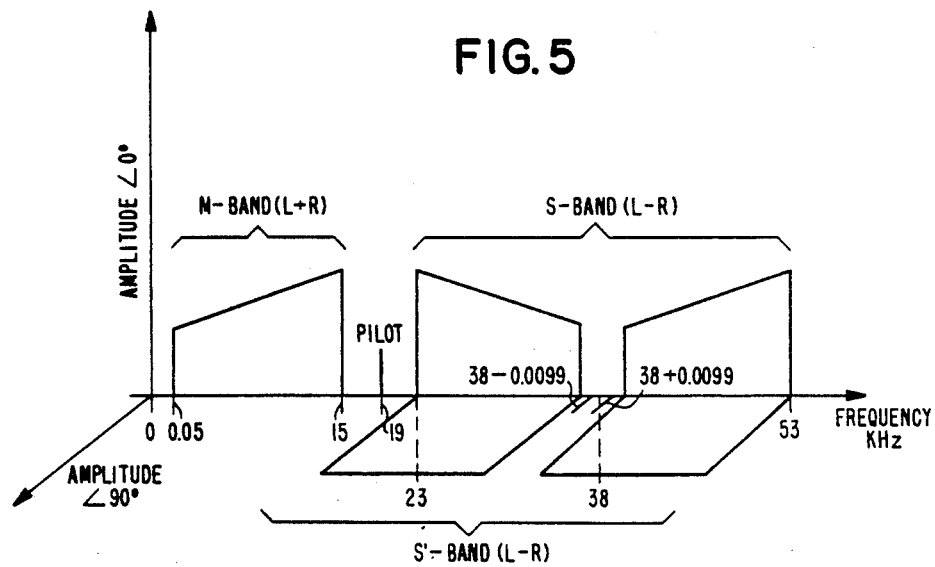
FIG. 5 shows a frequency spectrum of the FMX signal transmitted by the transmitter of FIG. 4.

The FM signal transmitted by the transmitter of FIG. 4 consists of the FM carrier that is frequency modulated by a composite signal which composite signal has the features shown in FIG. 5. The tone signal appears in the composite signal as a subsonic portion of the two "side bands" at (38+0.0099) Khz and (38−0.0099) Khz and both are products of modulation of the quadrature subcarrier 38 Khz/90° and lie in the quadrature S'-band. The conventional composite signal includes the in-phase portions of M-band, pilot and S-band. For FMX transmission the composite signal further includes the quadrature S'-band.

Figure 2:
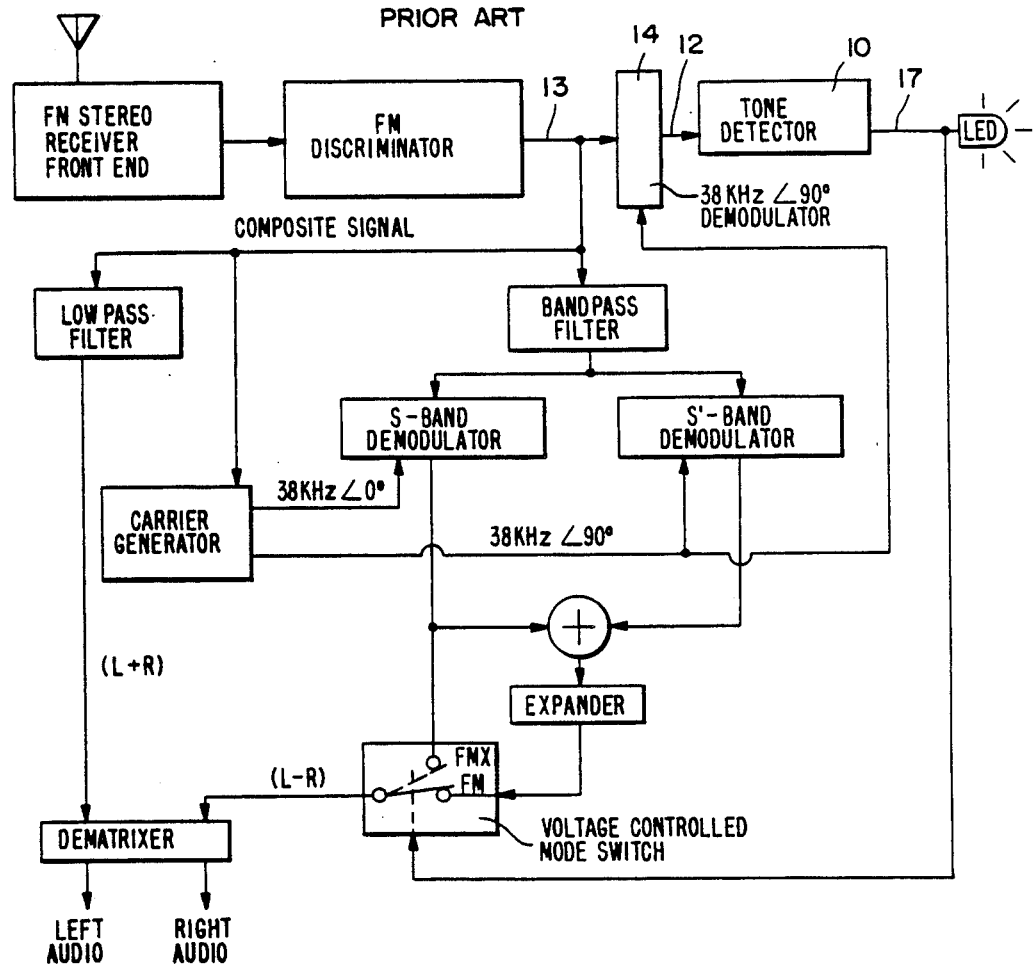
FIG. 2 shows a block diagram of a prior art FMX receiver.
Figure 3:
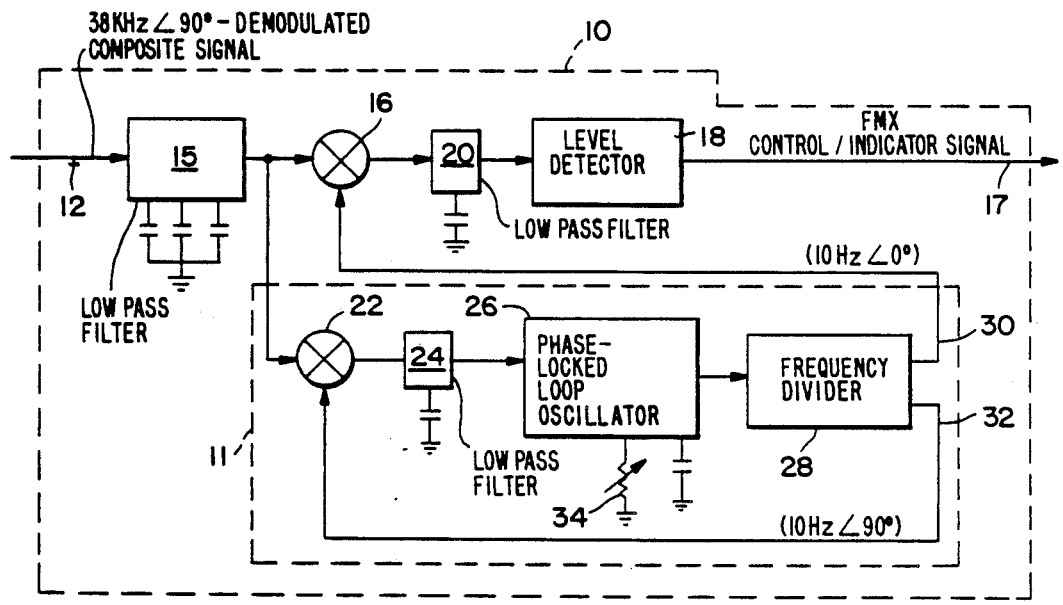
FIG. 3 shows in a more detailed block diagram the prior art tone detector block in the receiver of FIG. 2.
Figure 6:
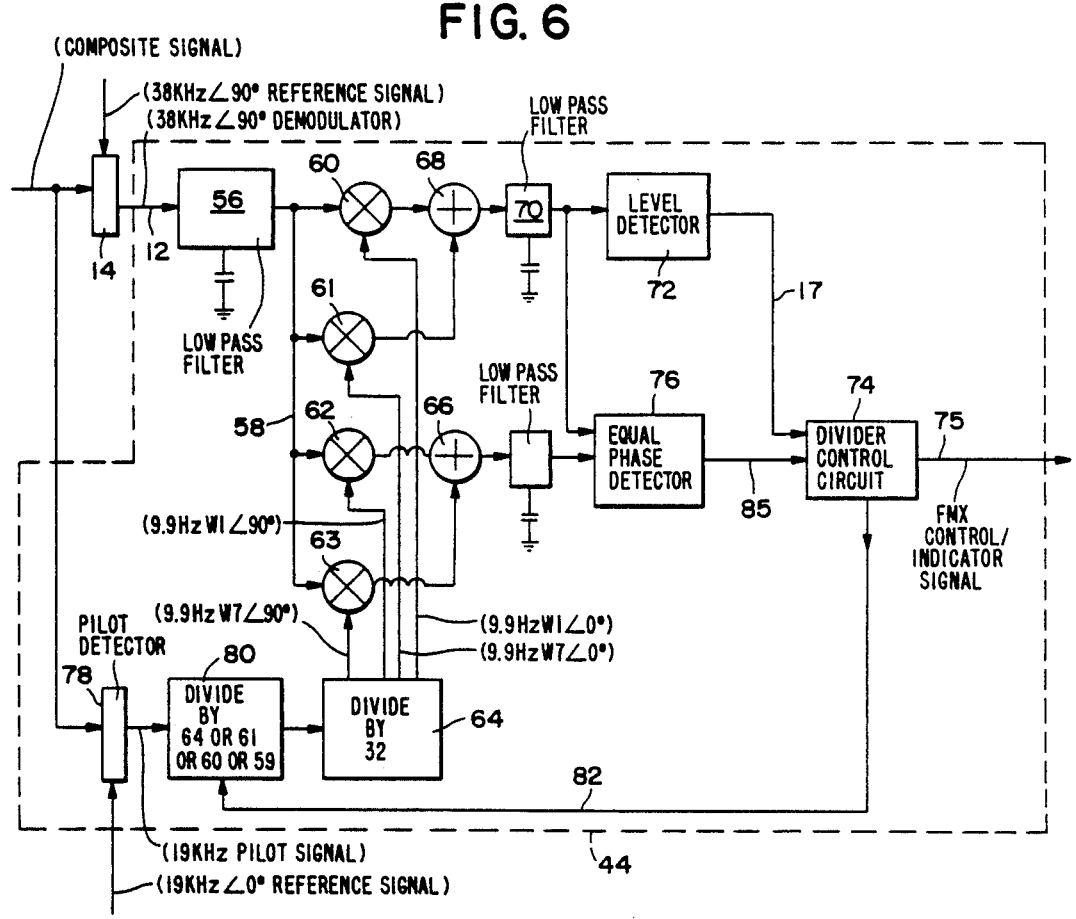
FIG. 6 shows a block diagram of a tone detector of this invention with a tone-signal phase locking feature.

Turning to FIG. 6, the tone detector 44 of this invention is to be substituted for the prior art tone detector 10 in the FMX receiver shown in FIG. 2 except that it additionally requires connection directly to the composite signal conductor 13 for detecting the phase and frequency of the pilot signal.

The 38 Khz quadrature demodulator 14, as has been noted, demodulates the S'-band portion of the composite signal. The single pole low pass filter 56 has an upper cut off frequency of about 100 Hz to pass the 9.9 Hz tone signal with little attenuation while filtering out the expanded audio (L-R) portion of the S'-band so that only very low frequency audible and subaudible signals including the tone signal, if present, appears at conductor 58. Conductor 58 is the input to the in-phase or zero angle Walsh-type phase comparator or multiplier that is comprised of discrete multipliers 60 and 61, and the summing network 68 that is an auxillary part of a phase-locked loop described below.

This Walsh phase comparator or demodulator is supplied with two zero angle or in-phase 9.9 Hz Walsh function reference signals, namely 9.9 HzW1/0° and 9.9 HzW7/0° from the frequency divider 64. Walsh mixer operation is described in the patent application of O. Richards and T. Field filed simultaneously herewith and assigned to the same assignee as is the present invention. A Walsh function signal generator and Walsh type demodulator are described in the above-noted application filed simultaneously herewith. The 9.9 HzW1/0° is a 9.9 Hz square wave signal. These Walsh signals are generated by divider 64 and are herein designated "10 Hz" reference signals.

At the output of the in-phase Walsh demodulator comprised of multipliers 60 and 61 and summing network 68 there is produced a beat note signal of frequency that is the difference between the respective frequencies of the tone signal from the filter 56 and the Walsh function signals from the frequency divider 64. The output signal from network 68 will at times be a little different from that of the tone signal but at other times will be identical to the 9.895833 Hz tone signal frequency. In the later case the beat note frequency is zero (e.g. DC) and the average magnitude of the beat note signal will be maximum. If Walsh function divider circuits (e.g. 64) and Walsh mixer circuits (e.g. 60, 61 and 68) are not used in a phase-locked loop portion of tone detectors of this invention and simple conventional square wave divider and mixer circuits are used instead, an expensive multipole filter must be used instead of filter 56 because Walsh demodulators themselves "filter" out the troublesome odd harmonics.

Each of the single pole low pass filters 70 has a 3 db down point of about 0.6 Hz. The bi-level level detector 72 has a voltage threshold set at a magnitude such that beat note signals of frequency greater than about 8 Hz will not trip the level detector, eliminating the audio and Walsh reference signal itself as potential tripping signals.

When the level detector 72 is tripped, its binary logic output signal changes, e.g. from the "zero" state to the "one" state, for indicating that the composite signal contains a subsonic tone. This tone indicating signal on conductor 17 is delayed a few hundred milliseconds in the divider control circuit 74 and presented at output conductor 75 for changing the receiver mode control switch (see FIG. 2) to the FMX-operating-mode position, and if desired to turn on an FMX mode lamp mounted at the control panel of the receiver.

This delayed mode-control signal is also translated in divider control logic circuit 74 into a multibit digital divider control signal for controlling at any instant which among several predetermined integral factors the divider 32 will use to divide the frequency of the pilot signal. Six operating modes are outlined in Table I.

TABLE I

| | | PLL OP. MODE | | | | | |
|---|---|---|---|---|---|---|---|
| 19 KHz PILOT | 9.9 Hz TONE | INAC-TIVE | TONE SEARCH | FMX INDICATOR | PHASE SEARCH | SIMULATED LOCK | LOCK |
| O | O | X | | | | | |
| X | O | | X | | | | |
| X | X | | | X | | | |
| X | X | | | | X | | |
| X | X | | | | | X | |
| X | X | | | | | | X |

TABLE II

| WALSH REFERENCE FREQUENCY ("10 Hz") | INAC-TIVE | TONE SEARCH | FMX INDICATOR | PHASE SEARCH | SIMULATED LOCK | LOCK | BEAT NOTE FREQUENCY |
|---|---|---|---|---|---|---|---|
| none | X | | | | | | none. |
| 19 KHz − 64 × 32 = 9.277344 Hz | | X | | | | | none |
| 19 KHz − 64 × 32 = 9.277344 Hz | | | X | | | | −0.61849 Hz |
| 19 KHz − 61 × 32 = 9.733607 Hz | | | | X | X | | −0.162227 Hz |
| and/or | | | | ↑ or ↓ | ↑ alternating ↓ | | |
| 19 KHz − 59 × 32 = 10.063559 Hz | | | | X | X | | +0.162227 |
| 19 KHz − 60 × 32 = 9.895833 Hz | | | | | | X | 0.0 Hz (DC) |

When no composite signal is present at conductor (FIG. 6), there are of course no pilot or tone signals at the outputs of detectors 14 and 78 respectively. This first condition is referred to as the inactive operating mode.

When a 19 Khz pilot signal is first detected by the pilot detector 78, a 19 Khz signal is provided to the main input of logic-controlled frequency divider 80 and the bi-level detector 72 will not have detected a tone signal and produces a binary low output signal. The divider control circuit 74 that is connected to the output of the level detector 74 sends via multiple-logic-signal connection 82 a tone-search mode signal to divider 80 causing it to divide the 19 Khz signal by 64 and sends a 0.296875 Khz signal to the divider 64. Divider 64 then divides by 32 to produce the two zero angle Walsh function reference signals W1/0° and W7/0° both of frequency 0.0092774 Khz (9.2774 Hz). The main phase-locked loop is comprised of demodulator mixers 62 and 63 plus summing network 66, filter 70, zero crossing detector 76, divider controller 74, and tandem connected dividers 80 and 64. The loop is under these conditions said to be in the tone search mode. This condition is seen in the context of the other operating modes by referring to Table I and Table II. The tone search mode persists until a tone signal is detected.

When a composite signal having been derived from a conventional non-FMX FM radio signal is present, then a pilot signal but no tone signal is present which condition corresponds to a tone search operating mode. When an FMX FM radio signal is first tuned to, the tone detector will initially operate also in this tone search mode.

When a tone signal is detected by detector 14 the operating condition of the phase-locked loop changes to the FMX indicator mode, and the 9.895833 Hz tone beats with the 9.277344 Hz Walsh function reference signal to produce a 0.61849 Hz beat note in the phase-locked loop at the input of bi-level detector 72. The binary high or "1" output signal of bi-level detector 72 produces a signal on line 17 as soon as the amplitude of the beat note exceeds the threshold of bi-level detector 72. That binary high signal is delayed in control circuit 74 by a brief 100 to 200 msec before changing the binary output signal at conductor 75 e.g. to a high or "1" level. This signal is the FMX indicator signal that is used for switching on the receiver's FMX-signal receiving circuitry.

The low pass filter 70 has a 3 db down corner point at about the beat note frequency, 0.61849 Hz, so it passes this beat note with an attenuation of about 0.7 and with a phase shift of around forty degrees. That phase shift is too great to permit searching for the phase at which the incoming tone and beat note are the same. It is highly desirable to establish that in-phase condition to generate a 9.895833 Hz signal in this tone detector circuit which because it is in phase with the tone signal is capable of being used to cancel the tone signal from the L-R signal passing through the FMX receiver's expander circuit.

Such an in-phase condition is established during a subsequent phase search operation mode that is initiated by the divider control circuit 74 at the termination of the approximately 200 msec delay ending the FMX indicator mode. The divider control circuit 74 produces a binary logic phase-search mode signal that causes the divider 80 to divide by either 59 or by 61 so that a simulated lock mode operation will be achieved. The outputs of the in-phase and quad-phase mixers corresponding to the outputs of summing networks 68 and 66, are connected to the inputs of an exclusive OR circuit (not shown) that is part of the equal phase detector 76, and the output of that exclusive OR circuit is the instruction to the divider 80 to select in the phase search mode divisor 59 or 61.

For the beat note to be maximally positive or maximally negative, the W1 Walsh signal produced at the output of divider 64 must be either in phase or exactly 180° out of phase with the incoming tone signal. Phase-lock loops stabilize at a phase of the incoming (tone) signal which will produce either a maximally positive or a maximally negative value as seen at the input of the bi-level detector 72 but not both. (See the book *Phase-lock Techniques* by Floyd M. Gardner, John Wiley & Sons, New York 1966, page 42.) This detector can lock on either phase of incoming (tone) signal because the polarity detector 76 monitors polarity at the input to bi-level detector 72. The phase of the zero-crossing detector inside polarity detector 76 is either inverted or not inverted depending on the polarity at the signal at the input of bi-level detector 72. This feature allows the phase-lock loop to lock on either phase of the incoming (tone) signal and just about halves the time (a full beat note cycle or 1.6 seconds) it could take if this capability to lock on the first to occur zero crossing were not present.

When the correct phase is thus found the divider control circuit 74 causes the divider 80 to alternately divide by 59 and 61 maintaining apparent phase-lock at the tone frequency as though division were by 60, a condition corresponding to the simulated lock mode.

After about 2 seconds of this simulated lock mode operation, determined by a delay circuit in the divide control block 74, that block 74 causes the divider 80 to divide by 60 to establish operation in the lock mode. In the lock mode the control signal generated by the divider control circuit 74 causes the divider 80 to divide the 19 Khz signal by exactly 60 producing the Walsh function signals at exactly 9.895833 Hz, the frequency of the transmitted tone.

The quadrature comparator demodulator of mixers 62 and 63, and the summing network 66 receives from divider 64 Walsh function quadrature reference signals W1/90° and W7/90° that are, as is the in-phase demodulator above it, operating at the "10 Hz" frequency produced by divider 64.

Figure 7:
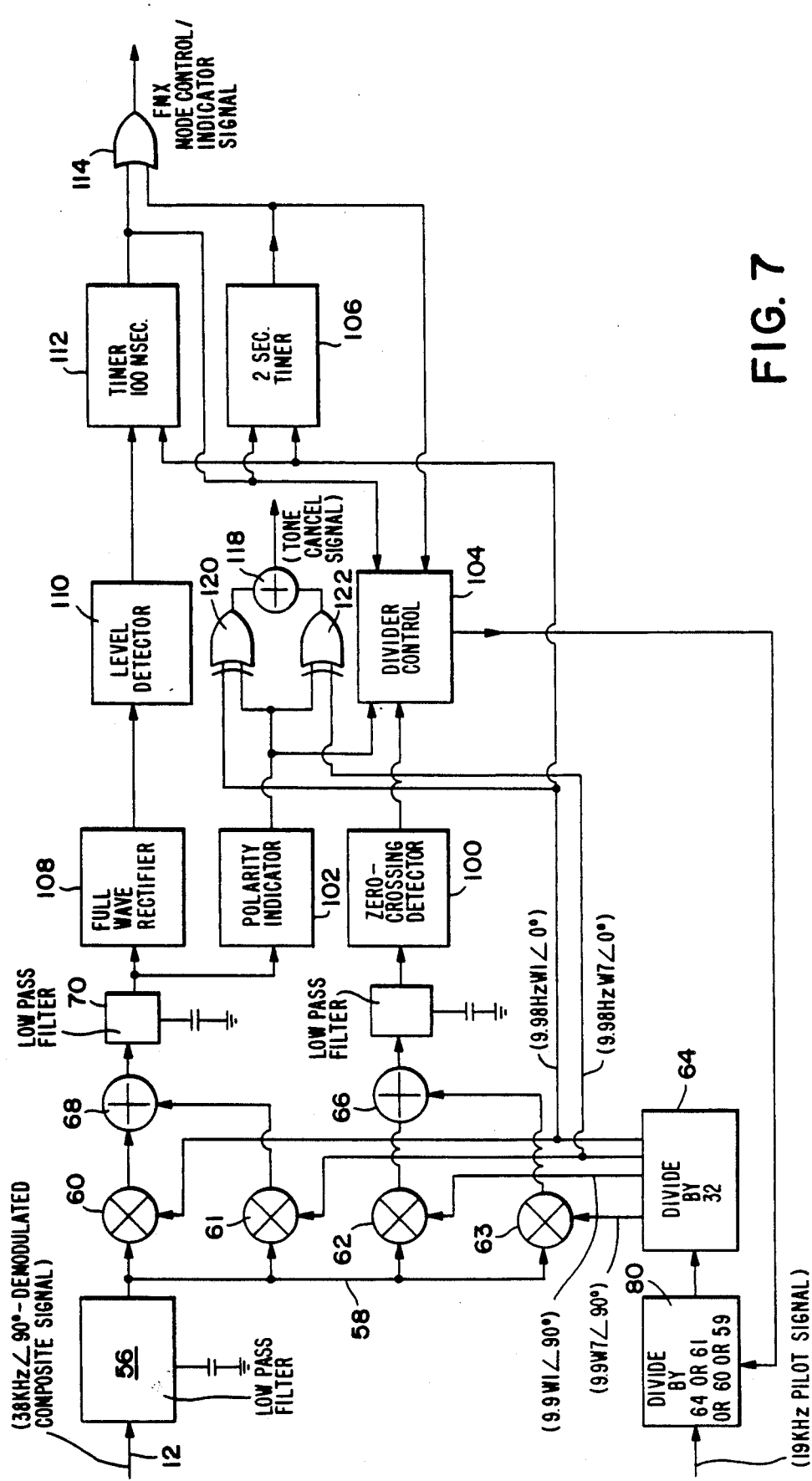
FIG. 7 shows a more detailed and expanded block diagram of the tone detector of FIG. 6.

The decoder illustrated in FIG. 7 shows the decoder of FIG. 6 wherein the equal phase detector 76 is broken into the zero crossing detector 100 and the polarity indicator 102. The zero crossing detector 100 is ambivalent 5 with respect to whether the two signals are either at 0° or 180° with respect to each other.

The polarity detector 102 has a logical output that is high only when the polarities of the tone and beat note are the same but is low when they are not the same polarity. Thus the divider control circuit 104 is enabled to instruct the divider 80 to produce alternating 9.73607 Hz and 10.063559 Hz reference Walsh signals and to initiate the simulated lock operating mode. This repetitive switching will provide an apparent lock of the loop on the tone signal and will endure for 2 seconds as determined by the timer 106 to terminate the simulated lock mode operation and initiate via the divider control circuit 104 the lock operating mode.

Likewise the bi-level level detector 72 of FIG. 6 becomes the full wave rectifier 108 and the level detector 110 which is now a simple voltage comparator or Schmitt trigger circuit. The timer 112 delays the logical output of the level detector 110 about 100 msec primarily to prevent "10 Hz" ripple on the −0.61849 Hz beat note from causing premature level detection by a momentary loss of level detection or by noise. Such "10 Hz" ripple arises because the demodulator 14 is a 38 Khz quadrature Walsh demodulator (mixers 60 and 61) of the double balanced mixer type that as a practical matter have a finite amount of offset which is direct coupled to the input of the "10 Hz" demodulators. This DC offset voltage causes the "10 Hz" ripple to appear at adder 68 and the filter 70 to appear superimposed on the beat note at the input of the level detector 110 and zero crossing detector 100. This could without the small delay timer 112 cause the divider control circuit 104 to hunt between instructions to operate in the search and simulated-lock or lock modes.

Timer 106 is implemented in the preferred embodiment using a switched-capacitor delay circuit. The 100 msec timer 112 is a clocked shift register delay circuit, clocked to the retrieved pilot signal. Both timer blocks delay setting their logic outputs to a high state when the inputs go high. Both likewise delay to turn low. But if input to the 100 msec timer 112 goes low before output of timer 112 goes high, timer 112 is reset so that input to timer 112 must remain high for an additional 100 msec to 200 msec before timer 112 output goes high. A high on the output of timer 112 initiates the FMX mode control signal, initiates the simulted lock mode and starts the 2 sec timer 106. Once output of 100 msec timer goes high input must go low for 100 msec to 200 msec before output 112 will begin to go low. Timer 112 thus helps prevent the ripple or noise causing false FMX indications. If output of timer 112 remains high for 2 seconds then output of timer 106 goes high initiating lock mode. The timer 112 output must now remain low for 2 seconds before lock mode will be turned off.

The logic outputs of the timers 112 and 106 are connected to the OR gate 114 that then generates the logic FMX mode control signal. That signal is high to turn on the FMX indicator lamp and the mode switch (FIG. 2) to the FMX position.

The FMX tone cancel signal is generated by the summing network 118 that sums the outputs of the two exclusive OR gates 120 and 122. It is exactly the same frequency and phase as is the tone signal itself and one input of each exclusive OR gate 120 and 122 is connected to the output of the polarity indicator 102. The other input receives the in-phase Walsh reference signals W1 and W7, respectively, from the divider 64.

Cancellation of the tone signal in the L-R signal is accomplished by applying the L-R signal and the tone cancel signal to the two inputs of a subtract circuit (not shown) and adjusting the amplitude of the L-R signal (and the tone signal it contains) so that the difference is zero.

More detailed description relating to the operation of standard FM- and FMX-capable receivers under multipath conditions is provided in the patent application to 0. Richards entitled *Stereo Decoder With Variable Bandpass* and the application by 0. Richards and T. Field entitled *Blend-On-Noise Stereo Decoder*. Both applications are assigned to the same assignee as is the present invention and both applications were filed concurrently with the present application.

What is claimed is:

1. A stereo FM radio transmission system of the type including a transmitter and at least one remote receiver, wherein said transmitter comprises a signal generator means for generating a supersonic subcarrier and a quadrature subcarrier which is of the same frequency and is 90° out of phase with the subcarrier; means for generating a supersonic pilot signal having a frequency that is an integer sub-multiple of the frequency of the subcarrier; means for forming a composite signal by combining stereophonically related audio left (L) and right (R) signals to form an M-band that is the audio signal sum L+R, for forming an S-band and an S'-band that are respectively sidebands of the subcarrier and the quadrature subcarrier after being AM modulated respectively by the L-R signal and a compressed L-R signal; an adder means for summing the M-band, the S-band and S'-bands, and the pilot signal to form the composite signal; a means for FM modulating a high frequency FM-carrier signal by the composite signal and for effecting radio transmission of the FM-modulated FM-carrier; and said system including at least one FM receiver comprising means operative in response to the reception of the FM modulated signal for recovering the composite signal, and means in said receiver for recovering the L-R and compressed L-R difference signals from the S-band and S'-band components respectively of the composite signal, wherein the improvement comprises;

said transmitter additionally comprising a tone generating means for generating a subaudible tone-indicator signal of frequency that is an integer submultiple of and is phase coherent with respect to said pilot frequency; and an amplitude modulating and adding means connected to said tone generator means and to said subcarrier generating means for generating and adding to the composite signal a quadrature-subcarrier signal that is AM modulated by the tone indicator signal;

said receiver additionally comprising means for demodulating said S-band and said S'band signals; a tone signal detecting means for detecting the tone-indicator signal; a phase-locked loop comprised of a dividing means for dividing the frequency of the pilot signal by said integer submultiple to provide a reference signal and means for comparing the reference signal with said subaudible-tone-indicator signal; and an enabling means connected to said phase-locked loop for enabling combining and maintaining the combining of the L-R S-band and the L-R S'-band signals only when the subaudible-tone-indicator signal is found to be of exactly the same frequency and phase as are the frequency and phase of the reference signal.

2. A tone detector comprising:
(a) a composite-signal input conductor adapted for connection to a source of a stereo composite signal that includes a pilot signal of a supersonic frequency and a sideband of a suppressed subcarrier signal which has a frequency that is an integer multiple of the supersonic frequency, the subcarrier signal also being modulated by a tone component of sub-audible frequency that is a predetermined integer submultiple of the pilot frequency;
(b) a demodulator means connected to said input conductor for retrieving the supersonic tone component;
(c) a pilot detector means connected to said input conductor for retrieving the pilot signal; and
(d) a phase-locked loop (PLL) circuit means comprised of a phase-locked loop having a tone-signal input connected to the output of said demodulator and having a pilot-signal input connected to the output of said pilot detector means
for when during a period corresponding to a PLL tone indicator operating mode, dividing the frequency of the retrieved pilot signal to generate a first-reference signal of frequency that is another integer submultiple of the pilot frequency which another submultiple is different than but within 5–10% of said predetermined integer submultiple; and for generating in said loop the product of the tone component and first reference signal which product is a first beat note signal of frequency that is the difference between the frequencies of the tone component and the first-reference signals; and for providing a unique indication output signal level to indicate the presence of the tone-component signal in the composite signal when the first beat note signal has an amplitude exceeding a predetermined value.

3. The tone detector of claim 2 additionally comprising an indicator lamp, connected to said PLL circuit means, for being illuminated only when the unique indication output signal is present.

4. The tone detector of claim 2 wherein said PLL circuit means is additionally for after the tone-indicator-mode period, dividing in a later period, corresponding to a simulated lock mode, the frequency of the retrieved pilot signal to alternately generate a pair of second-reference signals of frequencies which are equally greater and less than the pilot frequency divided by the predetermined submultiple and are within 0.03 to 3% of the tone signal frequency, and generating in said loop a product signal of the tone and the pair of second reference signals to further indicate the presence of the tone component in the composite signal.

5. The tone detector of claim 4 wherein the pilot signal frequency is 19 Khz and the predetermined integer submultiple is 1920.

6. The tone detector of claim 5 wherein the different integer submultiple is 2048.

7. The tone detector of claim 2 wherein said PLL circuit means is comprised of a phase-locked loop including a level detector means connected to the output of said demodulator means for generating one type logical signal when the beat note signal and thus the tone signal are absent in said loop and for generating the unique indication signal when the tone signal is present in said loop and the beat note signal has peak values exceeding a fixed magnitude.

8. The tone detector of claim 7 wherein said PLL circuit means additionally includes a frequency divider means having a main input connected to the output of said pilot detector means and having a multiple-logical-control-signals input, for dividing the pilot signal frequency by the another integer submultiple only when the combination of the control signals at said multiple-logical-control-signals input includes a first binary control signal in one binary state and additionally for dividing the pilot signal frequency by the predetermined integer submultiple only when the combination of the control signals includes the first binary control signal in the other binary state.

9. The tone detector of claim 8 wherein said PLL means additionally includes a multiplier circuit having a reference-signal input that is connected to the output of said frequency divider means and having a tone-input that is connected to the output of said demodulator means for producing a difference signal that is the product of the signals at said reference-signal input and at said tone-input to produce said beat note signal, the multiplier circuit output connected to the input of said level detector means.

10. The tone detector of claim 9 wherein said PLL circuit means additionally includes a divider-controller means, having an input connected to the output of said level detector and an output connected to said at least one logical-control inputs of said divider means, for causing said divider means to generate the first or second reference signal and at any moment for producing at the output of said multiplier circuit means the products of the tone and the reference signal present at that moment.

11. A tone detector comprising:
(a) a composite-signal input conductor adapted for connection to a composite signal source the composite signal having (1) a pilot signal, and (2) at least one AM sideband of a suppressed subcarrier signal wherein the side band includes an audio portion and a subsonic tone component of frequency that is phase-coherent with and is a predetermined integer submultiple of the pilot frequency;
(b) demodulator means connected to said input conductor for retrieving the subsonic tone component;
(c) reference signal generator means having a main input connected to said input conductor for detecting the pilot signal and having a control input (1) for in a first period when a control signal of one kind is applied to said control input, dividing the pilot frequency by a factor that is near but not equal to the predetermined submultiple and (2) for in another period when a control signal of another kind is applied to said control input, dividing the pilot frequency by a factor that is exactly equal to the predetermined factor, and for both conditions (1) and (2) generating an in-phase and quad-phase reference signal at one and another generator outputs respectively;
(d) multiplier phase comparator means connected to said one generator output of said reference signal generating means and to said demodulator means for mixing the reference signal and the demodulated composite signal;
(e) level detector means connected to said multiplier means for producing a tone-indicator signal only during a tone-indicator operating mode when the amplitude of the mixed signal in said multiplier means exceeds a preestablished level; and
(f) divider control means connected to the output of said level detector means and having an output connected to said divider-means control input for producing a control signal of the one kind when the tone indicator signal is not present at the level detector means output and for producing a control signal of the another kind when the tone indicator is present.

12. The tone detector of claim 11 wherein the first kind signal from divider control means is a search mode initiating signal to said divider means when said tone component of said composite signal is absent and the another kind signal is a lock mode initiating signal to said divider means when said tone component is present, said reference signal generator means having switchable search and lock operating modes for generating the in-phase reference signal by dividing the pilot frequency by a number which is unequal but close to said predetermined integer sub-multiple when operating in the search mode and by dividing the pilot frequency by said predetermined sub-multiple when operating in the lock mode.

13. The tone detector of claim 12 wherein the quad-reference signal is shifted 90° in phase with respect to the in-phase reference signal, and said tone detector is additionally comprised of a zero-crossing detector means connected to said another output of said reference signal generating means, for producing a logical one signal when the product of the tone signal and the quadrature signal has one polarity and producing a logical zero signal when the product of the tone signal and the quadrature signal has the opposite polarity.

14. The tone detector of claim 13 additionally comprising a polarity detector means connected to the output of said multiplier comparator means for producing a square wave signal of the same frequency and phase as is the signal at the output of said multiplier phase-comparator means.

15. The tone detector of claim 13 additionally comprising a first time delay means for terminating the indicator period after a predetemined time amounting to about 100 msec.

16. The tone detector of claim 15 wherein said divider control means, is for during said phase search operating mode, choosing and producing one of a pair of second-reference signals of frequencies which are equally greater and less respectively than the pilot frequency divided by the predetermined integer submultiple, the pair of frequencies being the pilot frequency divided by twin submultiples that are within ±0.03 to ±3% of the integer submultiple, to cause said tone detector to operate in the matter of a conventional phase-locked loop locked to the tone-signal frequency, when the exact-integer-submultiple divided pilot signal and the incoming tone signal are either exactly in phase or exactly 180° out of phase.

17. The tone detector of claim 16 wherein the signal output of the zero-crossing detector means is connected to said control input of the divider control means, and the output of said polarity means is connected to said divider control means and said divider control means is additionally for, producing a divider control signal having a square waveform of the same frequency but 180° out of phase with the output signal of the zero-crossing detector and causing said tone detector to lock at either the exact tone-signal phase or 180° out of phase with the tone signal.

18. The tone detector of claim 17 additionally comprising a second time delay means connected to said divider control means to terminate the simulated PLL lock mode after approximately two seconds by enabling generation of the lock mode signal, causing said divider means to divide the pilot signal frequency by exactly said predetermined submultiple, and initiating the lock operating mode.

19. The tone detector of claim 1 additionally comprising a single pole low pass filter connected between said multiplier means and said level detector means, having a 6 db-down/octive and a 3 db-down point of about 0.6 Hz.

* * * * *